United States Patent
Dadheech et al.

(10) Patent No.: US 10,981,195 B2
(45) Date of Patent: Apr. 20, 2021

(54) METHOD OF FORMING A SELF-CLEANING FILM SYSTEM

(71) Applicant: GM Global Technology Operations LLC, Detroit, MI (US)

(72) Inventors: Gayatri V. Dadheech, Bloomfield Hills, MI (US); Thomas A. Seder, Fraser, MI (US); James A. Carpenter, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 15/972,844

(22) Filed: May 7, 2018

(65) Prior Publication Data
US 2019/0337013 A1    Nov. 7, 2019

(51) Int. Cl.
*B05D 5/08* (2006.01)
*B05D 3/10* (2006.01)
(Continued)

(52) U.S. Cl.
CPC ............. *B05D 5/083* (2013.01); *A01N 59/16* (2013.01); *B05D 1/26* (2013.01); *B05D 3/0254* (2013.01);
(Continued)

(58) Field of Classification Search
CPC ........ B05D 5/083; B05D 3/107; B05D 3/108; B05D 3/0254; B05D 3/0263; B05D 3/0272; B05D 3/0281; B05D 3/007; B05D 3/06; B05D 1/26; A01N 59/16; C09D 5/14; C09D 11/30
See application file for complete search history.

(56) References Cited

U.S. PATENT DOCUMENTS 8,785,556 B2 *   7/2014   Brown .................. C09D 127/18
                                                          524/544
9,861,974 B2      1/2018   Dadheech et al.
(Continued)

FOREIGN PATENT DOCUMENTS

CN     110452575 A    11/2019
DE   102019110786 A1  11/2019

OTHER PUBLICATIONS

Ezra Lucas Hoyt Cates, "Development of Visible-To-Ultraviolet Upconversion Phosphors for Light-Activated Antimicrobial Technology", A Dissertation Presented to The Academic Faculty, In Partial Fulfillment Of the Requirements for the Degree Doctor of Philosophy in Environmental Engineering, May 2013, p. 1-227, Georgia Institute of Technology.

*Primary Examiner* — Dah-Wei D. Yuan
*Assistant Examiner* — Nga Leung V Law
(74) *Attorney, Agent, or Firm* — Harness, Dickey & Pierce, P.L.C.

(57) ABSTRACT

A method of forming a self-cleaning film system includes ink jet printing a composition onto a substrate. The composition includes an oleophobic material and a photocatalytic material. The method further includes curing the composition to form a self-cleaning film disposed on the substrate and thereby form the self-cleaning film system. The self-cleaning film includes a first plurality of regions including the photocatalytic material and disposed within the oleophobic material such that each of the first plurality of regions abuts and is surrounded by the oleophobic material.

12 Claims, 4 Drawing Sheets

(51) Int. Cl.
*B05D 1/26* (2006.01)
*B05D 3/02* (2006.01)
*C09D 11/30* (2014.01)
*C09D 5/14* (2006.01)
*A01N 59/16* (2006.01)

(52) U.S. Cl.
CPC ............... *B05D 3/107* (2013.01); *C09D 5/14* (2013.01); *C09D 11/30* (2013.01)

(56) References Cited

U.S. PATENT DOCUMENTS

| | | |
|---|---|---|
| 10,052,622 B2 | 8/2018 | Dadheech et al. |
| 10,274,647 B2 | 4/2019 | Seder et al. |
| 10,429,641 B2 | 10/2019 | Carpenter et al. |
| 2004/0206271 A1* | 10/2004 | Randler ............... C09D 11/326 106/31.28 |
| 2007/0215039 A1* | 9/2007 | Edwards ............ H01M 4/8626 118/46 |
| 2007/0237943 A1* | 10/2007 | Wakizaka .............. B82Y 30/00 428/328 |
| 2014/0147654 A1* | 5/2014 | Walther .............. C03C 17/3429 428/312.6 |
| 2015/0238644 A1* | 8/2015 | Sung ........................ B01J 27/14 422/187 |
| 2018/0251399 A1* | 9/2018 | Koch, III ................. C03C 17/42 |
| 2018/0318820 A1 | 11/2018 | Dadheech et al. |
| 2018/0333709 A1 | 11/2018 | Seder et al. |
| 2018/0333710 A1 | 11/2018 | Dadheech et al. |
| 2018/0333711 A1 | 11/2018 | Dadheech et al. |
| 2018/0333756 A1 | 11/2018 | Seder et al. |
| 2018/0334742 A1 | 11/2018 | Dadheech et al. |

\* cited by examiner

METHOD OF FORMING A SELF-CLEANING FILM SYSTEM

The disclosure relates to a method of forming a self-cleaning film system.

Devices, such as display systems, are often designed to be touched by an operator. For example, a vehicle may include a display system that presents information to an operator via a touchscreen. Similarly, an automated teller machine or kiosk may include a display system that is activated by touch.

Other devices, such as cameras and eyeglasses, generally include a lens surface which may be inadvertently touched by an operator during use. Further, other devices such as vehicles, windows, mirrors, appliances, cabinetry, furniture, cellular telephones, fingerprint scanners, sensors, copiers, medical instruments, and countertops may also include one or more surfaces which may be touched by an operator. Therefore, during use, an operator may deposit fingerprints, bacteria, and/or oils onto such devices and surfaces.

SUMMARY

A method of forming a self-cleaning film system includes ink jet printing a composition onto a substrate. The composition includes an oleophobic material and a photocatalytic material. The method further includes curing the composition to form a self-cleaning film disposed on the substrate and thereby form the self-cleaning film system. The self-cleaning film includes a first plurality of regions including the photocatalytic material and disposed within the oleophobic material such that each of the first plurality of regions abuts and is surrounded by the oleophobic material.

Ink jet printing may include depositing the composition from a printhead onto the substrate. In one aspect, the printhead may include at least one piezoelectric crystal, and ink jet printing may include propelling the composition from the at least one piezoelectric crystal onto the substrate. In another aspect, depositing may include heating the composition and expelling the composition from the printhead onto the substrate. Further, ink jet printing may include simultaneously depositing the oleophobic material and the photocatalytic material onto the substrate. Curing includes heating the composition.

The oleophobic material may be one of polytetrafluoroethylene and fluorinated diamond-like carbon. The photocatalytic material may be titanium dioxide present in anatase form. Ink jet printing may include depositing the composition onto the substrate such that the first plurality of regions form a non-periodic pattern.

In one aspect, the substrate may include an anti-reflection film including a first sheet formed from titanium dioxide; a second sheet formed from silicon dioxide and disposed on the first sheet; and a third sheet formed from titanium dioxide and disposed on the second sheet. The method may further include, prior to ink jet printing the composition, ink jet printing the anti-reflection film. Ink jet printing the composition may include depositing the composition onto the third sheet such that the first plurality of regions form a non-periodic pattern.

The method may also include contacting at least one of the first plurality of regions and squalene; diffusing the squalene along the self-cleaning film from the oleophobic material to at least one of the first plurality of regions; oxidizing the squalene; and vaporizing the squalene.

In one aspect, the photocatalytic material may be doped with silver and the method may further include disrupting bacteria growth on the substrate. In another aspect, the self-cleaning film may further include a second plurality of regions disposed within the oleophobic material such that each of the second plurality of regions abuts and is surrounded by the oleophobic material. Each of the second plurality of regions may include silver, and the method may further include disrupting bacteria growth on the substrate.

In another aspect, the method may further include feeding the substrate from a first roll. After feeding, the method may include continuously ink jet printing the composition onto the substrate. The method may also include continuously rolling the self-cleaning film disposed on the substrate onto a second roll to thereby form the self-cleaning film system.

In another embodiment, a method of forming a self-cleaning film system includes disposing a sol-gel material onto a substrate; and hydrolyzing and condensing the sol-gel material to chemically bond an adhesion layer to the substrate. After disposing, the method includes depositing a composition onto the adhesion layer. The composition includes an oleophobic material and a photocatalytic material. The method also includes curing the composition to form a self-cleaning film disposed on the adhesion layer and thereby form the self-cleaning film system. The self-cleaning film includes a first plurality of regions including the photocatalytic material and disposed within the oleophobic material such that each of the first plurality of regions abuts and is surrounded by the oleophobic material. The photocatalytic material is physically trapped by the adhesion layer.

Depositing may include ink jet printing the composition from a printhead onto the adhesion layer by simultaneously depositing the oleophobic material and the photocatalytic material onto the adhesion layer. Disposing may include ink jet printing the sol-gel material from a printhead onto the substrate.

In one aspect, the photocatalytic material may include silver, and the method may include disrupting bacteria growth on the substrate.

In another aspect, the method may also include contacting the self-cleaning film with squalene; diffusing the squalene along the self-cleaning film from the oleophobic material to at least one of the first plurality of regions; oxidizing the squalene; and vaporizing the squalene.

In a further embodiment, a method of forming a self-cleaning film system includes disposing an upconversion layer formed from a luminescent material onto a substrate. The upconversion layer is configured for converting a first electromagnetic radiation having a wavelength of from 490 nm to 450 nm to a second electromagnetic radiation having an ultraviolet wavelength of from 10 nm to 400 nm. After disposing, the method includes depositing a composition onto the upconversion layer. The composition includes an oleophobic material and a photocatalytic material. The method also includes curing the composition to form a self-cleaning film disposed on the upconversion layer and thereby form the self-cleaning film system. The self-cleaning film includes a first plurality of regions including the photocatalytic material and disposed within the oleophobic material such that each of the first plurality of regions abuts and is surrounded by the oleophobic material.

Depositing may include ink jet printing the composition from a printhead onto the upconversion layer by simultaneously depositing the oleophobic material and the photocatalytic material onto the upconversion layer. Disposing may include ink jet printing the luminescent material from a printhead onto the substrate.

In one aspect, the photocatalytic material includes silver and the method may further include disrupting bacteria growth on the substrate.

In another aspect, the method may further include contacting the self-cleaning film with squalene; diffusing the squalene along the self-cleaning film from the oleophobic material to at least one of the first plurality of regions; oxidizing the squalene; and vaporizing the squalene.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
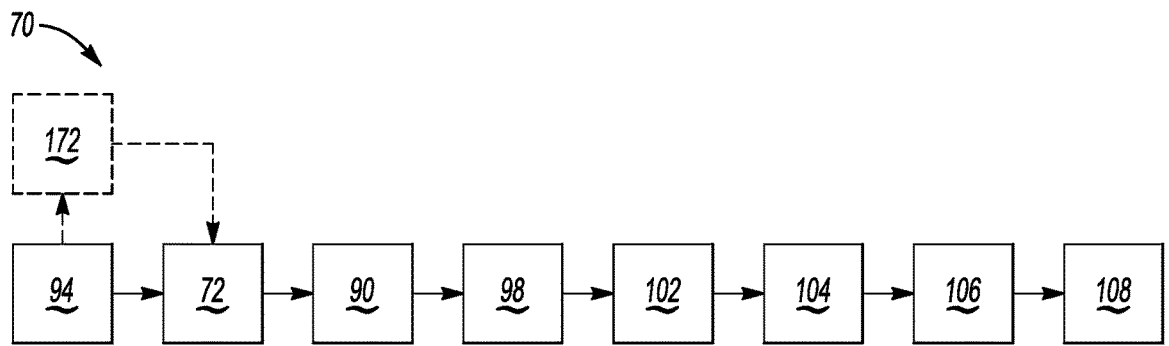
FIG. 1 is a flowchart of a method of forming a self-cleaning film system.
Figure 3:
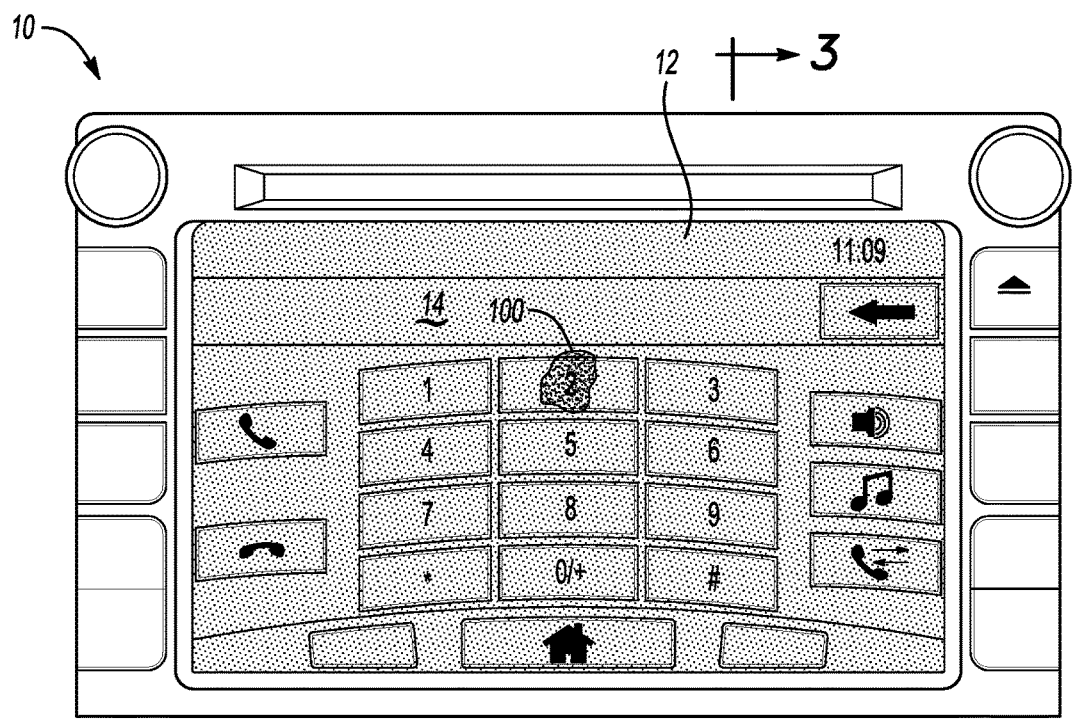
FIG. 3 is a schematic illustration of a front view of the self-cleaning film system formed by the method of FIG. 1.

Referring to the Figures, wherein like reference numerals refer to like elements, a method 70 of forming a self-cleaning film system 10 (FIG. 3) is shown generally in FIG. 1. The self-cleaning film system 10 formed by the method 70 may be configured for reducing a visibility or conspicuity of a contaminant 100 (FIG. 3). For example, the method 70 and self-cleaning film system 10 may be suitable for applications in which an operator may touch and deposit fingerprints, oils, and/or other organic or carbon-based contaminants 100 or pathogens onto a screen, lens, or surface. More specifically, the method 70 and self-cleaning film system 10 may be useful for applications requiring a clean, substantially fingerprint-free screen, lens, or surface. That is, the self-cleaning film system 10 may be useful for removing fingerprints and other organic contaminants 100 from such screens, lenses, or surfaces.

For example, the self-cleaning film system 10 may be useful for automotive applications such as in-dash navigation systems which include a touchscreen, or vehicle cameras which include a lens. Alternatively, the self-cleaning film system 10 may be useful for non-automotive applications such as, but not limited to, consumer electronics, cellular telephones, eyewear, personal protective equipment, appliances, furniture, kiosks, fingerprint scanners, medical devices, sensors, aircraft, and industrial vehicles.

Referring to FIG. 3, the self-cleaning film system 10 includes a self-cleaning film 14 disposed on a substrate 12, e.g., chemically bonded or physically bonded to the substrate 12 as set forth in more detail below. The self-cleaning film 14 may be configured to cover and protect the substrate 12 from fingerprints, oils, pathogens, and organic contaminants 100. That is, the self-cleaning film 14 may be configured to cause fingerprints, oils, pathogens, and organic contaminants 100 deposited on the self-cleaning film 14 to vanish, disappear, or vaporize so as to maintain a clean substrate 12 that is capable of displaying crisp images or reflections.

More specifically, as described with reference to FIG. 3A, the self-cleaning film 14 may have a first surface 16 and a second surface 18 spaced opposite the first surface 16. The second surface 18 may abut the substrate 12, and the first surface 16 may be substantially free from squalene, organic material, and/or other oils of fatty acids. As used herein, the terminology squalene refers to an organic compound having 30 carbon atoms and represented by the International Union of Pure and Applied Chemistry name (6E,10E,14E,18E)-2,6,10,15,19,23-hexamethyltetracosa-2,6,10,14,18,22-hexaene. In general, the self-cleaning film 14 may be characterized as a thin film and may have a thickness 20 of, for example, from 10 nm to 150 nm.

Figure 3A:
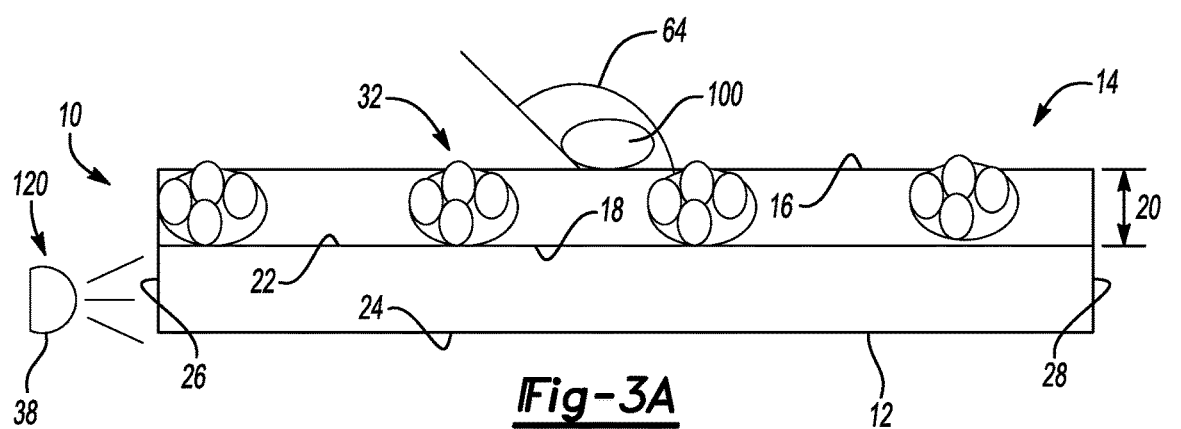
FIG. 3A is a schematic illustration of a cross-sectional view of the self-cleaning film system of FIG. 3 taken along section line 3-3.
Figure 3B:
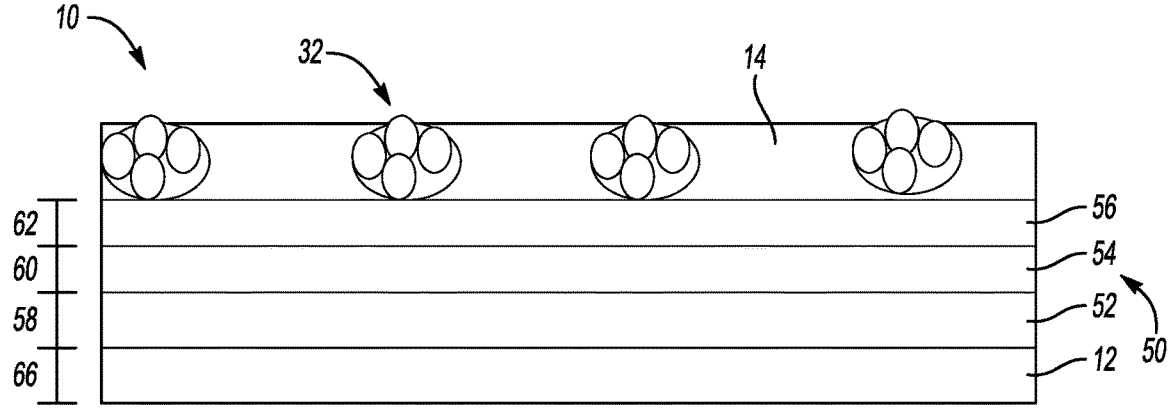
FIG. 3B is a schematic illustration of a cross-sectional view of another embodiment of the self-cleaning film system of FIG. 3 taken along section line 3-3.

With continued reference to FIG. 3A, the substrate 12 may have a proximal surface 22 abutting the second surface 18 and a distal surface 24 spaced opposite the proximal surface 22. Therefore, the substrate 12 and the self-cleaning film 14 may be configured to transmit visible light through the proximal surface 22, the distal surface 24, the first surface 16, and the second surface 18. The substrate 12 may also have a first edge 26 connecting the proximal surface 22 and the distal surface 24, and a second edge 28 spaced opposite the first edge 26. In some embodiments, as best shown in FIG. 3B, the substrate 12 may also include an anti-reflection film 50. The anti-reflection film 50 may be configured for reducing a reflection off the self-cleaning film system 10 and thereby improving an efficiency of the self-cleaning film system 10 since lost light in the system 10 may be minimized. As such, the self-cleaning film system 10 has both self-cleaning capabilities and comparatively low reflectance. Although described in more detail below, the anti-reflection film 50 may be formed from an anti-reflection coating comprising alternating layers 52, 54, 56 (FIG. 3B) of silicon dioxide and titanium dioxide.

Referring now to FIGS. 1-3A, the method 70 includes ink jet printing 72 (FIG. 2) a composition 74 (FIG. 2) onto the substrate 12 (FIG. 3A). The substrate 12 may be formed from a vitreous, transparent material suitable for refracting visible light. For example, in one embodiment, the substrate 12 may be formed from at least one of silicon dioxide and plastic. In another example, the substrate 12 may be formed from a polycarbonate or other plastic, leather, metal, wood, or composite. The substrate 12 may be configured as, by way of non-limiting examples, a screen of a display system, a lens of eyeglasses or goggles, a visor of a helmet, a surface of a refrigerator, a face of a cabinet, a door panel of a vehicle, a touchscreen of a kiosk, or as another surface or device that may be touched by an operator.

The composition 74 (FIG. 3A) includes an oleophobic material and a photocatalytic material.

As used herein, the terminology oleophobic may refer to a material that is resistant to or lacks a strong affinity for oil.

The oleophobic material may be selected from the group consisting of fluorinated organic compounds, fluorinated inorganic compounds, and combinations thereof. For example, the oleophobic material may be selected from the group consisting of a perfluorocarbon siloxane polymer, polytetrafluoroethylene, diamond-like carbon, fluorinated diamond-like carbon, and fluorinated tin (IV) oxide. In one example, the oleophobic material may be selected from the group consisting of a fluorocarbon polymer, organosiloxane, a fluorinated organosiloxane, and combinations thereof. More specifically, the oleophobic material may be selected from one of polytetrafluoroethylene and fluorinated diamond-like carbon. For example, in one embodiment, the oleophobic material may be a fluorinated material, such as fluorinated diamond-like carbon. In another embodiment, the oleophobic material may be polytetrafluoroethylene.

The photocatalytic material may provide the self-cleaning film 14 with self-cleaning capability. That is, the photocatalytic material may oxidize and/or vaporize organic material, e.g., squalene, present on the first surface 16 (FIG. 3A) of the self-cleaning film 14, as set forth in more detail below. In particular, the photocatalytic material may be a light-activated photocatalyst upon exposure to, for example, visible or ultraviolet light.

Suitable photocatalytic materials may include, but are not limited to, photo-oxidative semiconductors, semiconducting oxides, doped metal oxides, heterojunction materials, and combinations thereof. For example, the second material may be titanium dioxide. In one embodiment, the photocatalytic material may be titanium dioxide and may be present in an anatase form, which may exhibit a comparatively higher photocatalytic activity than a rutile form of titanium dioxide. Further, the photocatalytic material may be doped to form a functionalized photocatalytic material, e.g., functionalized titanium dioxide. For example, the functionalized photocatalytic material may be doped with a metal such as, but not limited to, chromium, cobalt, copper, vanadium, iron, silver, platinum, molybdenum, lanthanum, niobium, and combinations thereof. In one embodiment, the photocatalytic material may be doped with silver. Alternatively, the functionalized photocatalytic material may be doped with a non-metal such as, but not limited to, nitrogen, sulfur, carbon, boron, potassium, iodine, fluorine, and combinations thereof.

The photocatalytic material may be characterized as a nanoparticle and may have an average diameter measureable on a nanometer scale. That is, the photocatalytic material may have an average diameter of from 30 nm to 70 nm. For example, the photocatalytic material may have an average diameter of from 40 nm to 60 nm. As further examples, the photocatalytic material may have an average diameter of 35 nm or 40 nm or 45 nm or 50 nm or 55 nm or 60 nm or 65 nm. In one embodiment, the photocatalytic material may have an average diameter of about 50 nm. At average diameters of less than 30 nm or greater than 70 nm, the photocatalytic material may scatter light and/or insufficiently photocatalyze the contaminant 100. Generally, the photocatalytic material may be present in the self-cleaning film 14 in an amount of from about 10 parts by volume to about 35 parts by volume based on 100 parts by volume of the self-cleaning film 14.

Figure 2:
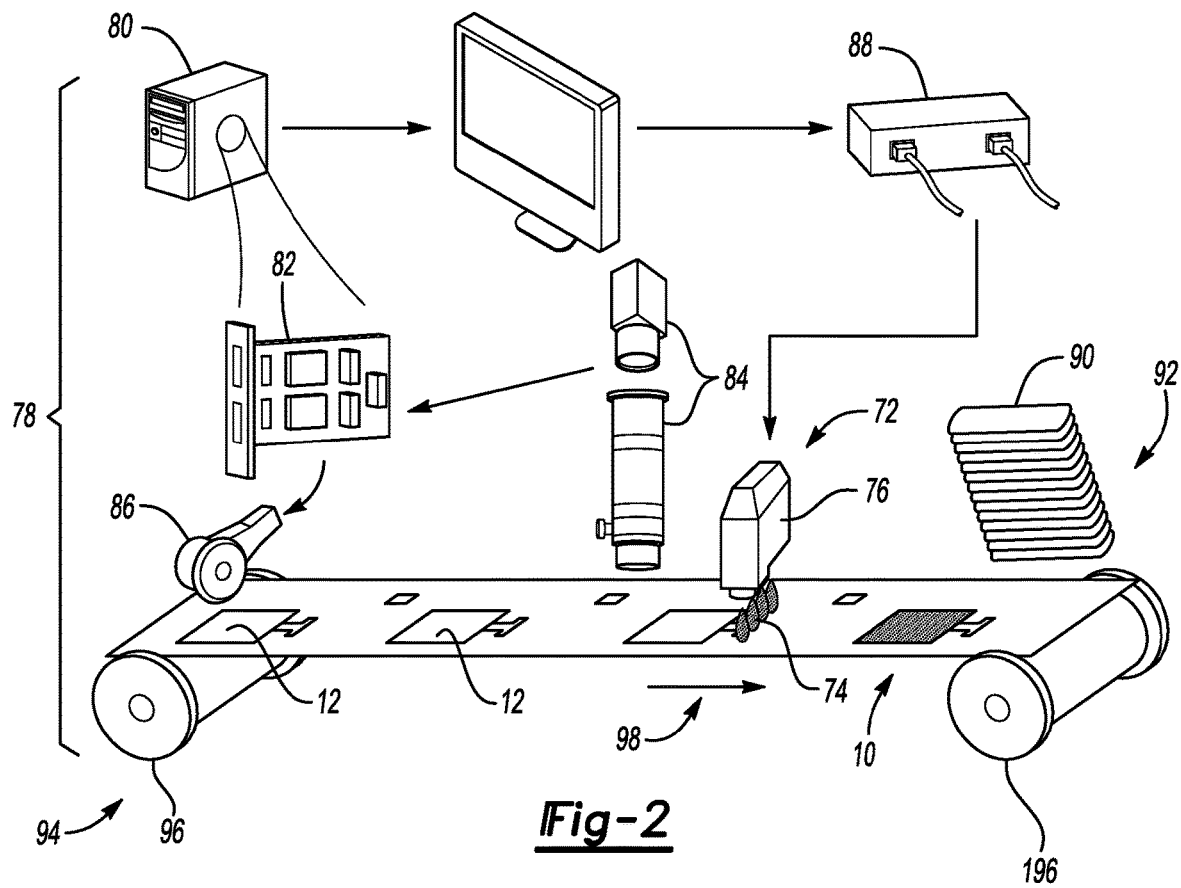
FIG. 2 is a schematic illustration of a perspective view of a portion of the method of FIG. 1.

Referring again to the method 70 as described generally with reference to FIG. 2, ink jet printing 72 may include depositing the composition 74 from a printhead 76 onto the substrate 12. That is, ink jet printing 72 may include simultaneously depositing the oleophobic material and the photocatalytic material, i.e., the composition 74, onto the substrate 12.

More specifically, a non-limiting example of an ink jet printing system, illustrated generally at 78 in FIG. 2, may include a control module 80, e.g., a computer, configured for commanding and controlling various components of the ink jet printing system 78. In particular, the control module 80 may include an image acquisition board 82 configured for storing image or ink jet printing commands.

In addition, the ink jet printing system 78 may include a camera 84 or other optical device configured for monitoring the substrate 12 and/or deposition of the composition 74. The camera 84 may be disposed in communication with the image acquisition board 82 and an encoder device 86 configured for reading positional, directional, and/or identification data of the substrate 12. Therefore, in operation, the control module 80, the camera 84, the image acquisition board 82, and the encoder device 86 may communicate to accurately and efficiently position the substrate 12 for ink jet printing 72.

Further, the ink jet printing system 78 may include, for example, a printer manager board 88 disposed in communication with the control module 80 and configured for relaying signals or commands to the printhead 76. For example, the printer manager board 88 may relay color, quantity, speed, ink viscosity, and/or positional data to the printhead 76 to thereby control the deposition of the composition 74 onto the substrate 12.

Ink jet printing 72 may include piezoelectric ink jet printing and/or bubble ink jet printing. That is, in a piezoelectric ink jet printing embodiment, the printhead 76 may include at least one piezoelectric crystal (not shown), and ink jet printing 72 may include propelling the composition 74 from the at least one piezoelectric crystal onto the substrate 12. More specifically, the composition 74 may be stored within one or more tanks (not shown) disposed in fluid communication, through a narrow tube, with an ink dispenser (not shown). The composition 74 may flow through the narrow tube from the one or more tanks to the ink dispenser via capillary action such that a droplet of the composition 74 may be disposed at an outlet end of the narrow tube. When the printer manager board 88 transmits a print command or signal to the printhead 76, the printer manager board 88 may simultaneously electrically energize one or more electrical contacts disposed in communication with the at least one piezoelectric crystal. Consequently, the at least one piezoelectric crystal may change shape, e.g., flex or bend or elongate or shrink, and press against a membrane to thereby translate the membrane towards the ink dispenser. As the membrane presses against the ink dispenser, a pressure within the ink dispenser may increase and thereby force the droplet of composition 74 from the outlet end of the narrow tube onto the substrate 12 as a dot. The process may be repeated multiple times, e.g., thousands of times, to thereby deposit the composition 74 onto the substrate 12.

In another bubble ink jet printing embodiment, ink jet printing 72 and depositing may include heating the composition 74 and expelling the composition 74 from the printhead 76 onto the substrate 12. For example, the printhead 76 may include a plurality of nozzles (not shown) each including a resistor and disposed in fluid communication with the one or more tanks. The printer manager board 88 may electronically activate one or more of the plurality of nozzles by transmitting an electric current through each respective resistor to heat the resistor. Such heat may then increase a temperature of the composition near the respective nozzle to form a bubble of composition vapor. The bubble of composition vapor may expand and burst to thereby deposit the composition onto the substrate 12 as a dot. Further, as the bubble of composition vapor bursts, a partial vacuum may be drawn in the respective nozzle which may consequently draw additional composition to the nozzle in preparation for bubble ink jet printing a subsequent dot of composition 74. The process may be repeated multiple times, e.g., thousands of times, to thereby deposit the composition 74 onto the substrate 12.

Referring again to FIGS. 1 and 2, the method 70 further includes curing 90 the composition 74 to form the self-cleaning film 14 disposed on the substrate 12 and thereby form the self-cleaning film system 10. In one embodiment, curing 90 may include heating the composition 74 to form the self-cleaning film 14. For example, the composition 74 deposited onto the substrate 12 may be baked by a curing station 92 (FIG. 2). Alternatively or additionally, curing 90 may include drying the composition 74, e.g., air-drying or contacting the composition 74 with a drying fluid, to form the self-cleaning film 14.

Referring now to FIG. 3A, the self-cleaning film 14 includes a first plurality of regions 32 including the photocatalytic material and disposed within the oleophobic material such that each of the first plurality of regions 32 abuts and is surrounded by the oleophobic material.

Figure 3C:
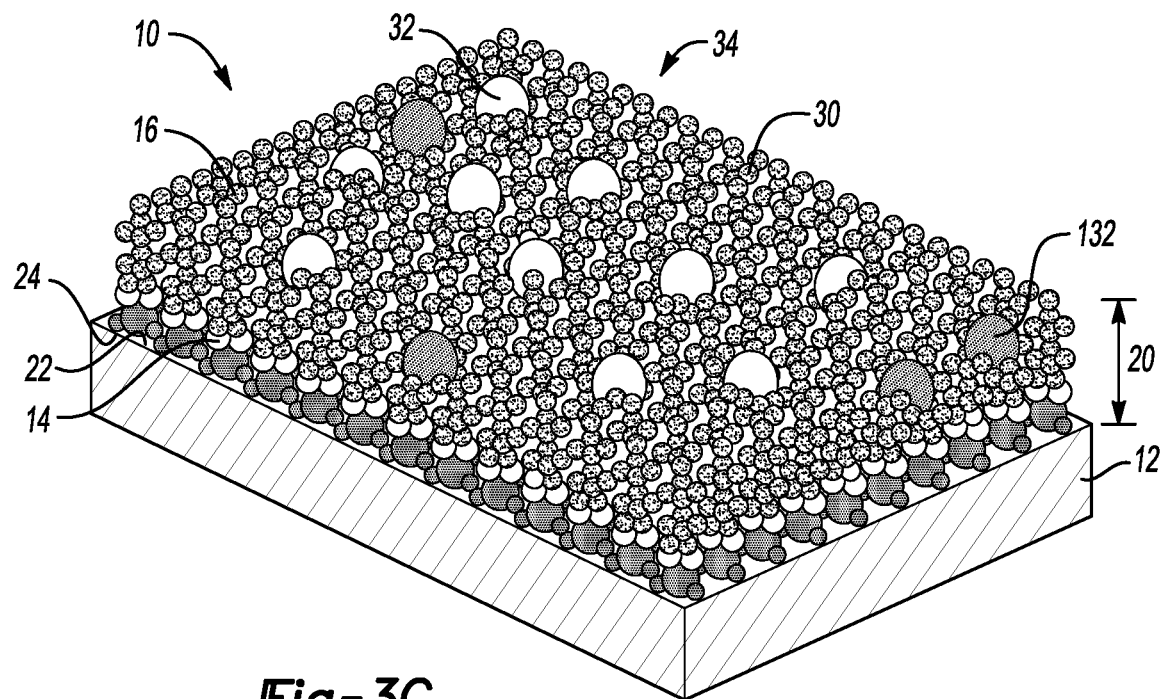
FIG. 3C is a schematic illustration of a perspective view of an additional embodiment of the self-cleaning film system of FIG. 3.

In particular, as best shown in FIG. 3C, the self-cleaning film 14 may include a monolayer 30 formed from the oleophobic material. The monolayer 30 may form a majority of the self-cleaning film 14 and may be characterized as a monolayer field. As used herein, the terminology monolayer refers to a layer having a thickness 20 (FIG. 3C) of one molecule. That is, the monolayer 30 is one molecule thick and may be characterized as a thin layer. In particular, the monolayer 30 may have a thickness 20 of from 5 nm to 15 nm, e.g., 10 nm, when the monolayer 30 is formed from polytetrafluoroethylene. Alternatively, the monolayer 30 may have a thickness 20 of from 40 nm to 60 nm, e.g., 45 nm or 50 nm or 55 nm, when the monolayer 30 is formed from fluorinated diamond-like carbon. In another embodiment, the monolayer 30 may be formed from a plurality of fluorinated diamond-like carbon nanoparticles and may have a thickness 20 of from 5 nm to 60 nm, e.g., 10 nm or 15 nm or 20 nm or 25 nm or 30 nm or 35 nm or 40 nm or 45 nm or 50 nm or 55 nm. That is, for some embodiments, the monolayer 30 may be formed from particles measureable on the nanometer scale, i.e., fluorinated diamond-like carbon nanoparticles, and may have a thickness 20 of from 10 nm to 60 nm. Thicknesses outside the aforementioned ranges may diminish the optical transparency, workability, and oleophobicity of the self-cleaning film 14. For example, an increased thickness 20 of the monolayer 30 may compromise the optical transparency of the self-cleaning film 14.

In one non-limiting example, the oleophobic material may be one of polytetrafluoroethylene and fluorinated diamond-like carbon; the photocatalytic material may be titanium dioxide in anatase form; and ink jet printing 72 may include depositing the composition 74 onto the substrate 12 such that the first plurality of regions 32 form a non-periodic pattern 34. The first plurality of regions 32 may be disposed within the monolayer 30 in the non-periodic pattern 34 such that each of the first plurality of regions 32 abuts and is surrounded by the oleophobic material.

The first plurality of regions 32 may be situated within and along the monolayer 30 but may not be covered by the oleophobic material. In particular, the first plurality of regions 32 may not be equally spaced apart from each other along the first surface 16. Rather, the non-periodic pattern 34 may be non-repeating along the first surface 16 such that the first plurality of regions 32 are randomly disposed along the first surface 16. That is, the first plurality of regions 32 may be randomly spaced throughout the monolayer 30 along the first surface 16, and the first plurality of regions 32 may be non-uniformly spaced apart from one another along the first surface 16. Stated differently, the monolayer 30 and the first plurality of regions 32 may be situated or arranged in a patch field of varying size, ratio, and pattern 34 so that the non-periodic pattern 34 is aperiodic or chaotic. As such, the non-periodic pattern 34 may sufficiently scatter light so as to minimize diffraction within the self-cleaning film system 10.

Further, as described with continued reference to FIG. 3C, each of the first plurality of regions 32 may have a diameter of less than or equal to 3 microns to reduce sparkles visible on the self-cleaning film 14. That is, at diameters of greater than 3 microns, sparkling and refracted light may be visible to a user, which may interfere with an optical transparency or usability of the self-cleaning film 14, particularly for applications in which the self-cleaning film 14 is applied to a display 212 (FIG. 3E).

In other non-limiting embodiments, the first plurality of regions 32 may include a semiconducting oxide such as, but not limited to, zinc oxide, bismuth, tin oxide, and combinations thereof. The semiconducting oxide may be selected to have a band gap separation suitable for a photocatalytic reaction, as set forth in more detail below.

In general, the first plurality of regions 32 may be present in the self-cleaning film 14 in an amount of from about 10 parts by volume to about 90 parts by volume based on 100 parts by volume of the self-cleaning film 14. More specifically, the oleophobic material and a photocatalytic material may be present in the self-cleaning film 14 in a ratio of parts by volume oleophobic material to parts by volume photocatalytic material of from 90:10 to 10:90. For example, the oleophobic material and the photocatalytic material may be present in the ratio of 85:15 or 80:20 or 75:25 or 70:30 or 65:35 or 60:40 or 55:45 or 50:50 or 45:55 or 40:60 or 35:65 or 30:70 or 25:75 or 20:80 or 15:85. In one example, the oleophobic material and the titanium dioxide may be present in the self-cleaning film 14 in a ratio of parts by volume oleophobic material to parts by volume photocatalytic material of 80:20. At ratios less than 10:90, the self-cleaning film 14 may not be optically transparent, may not remove squalene or other contaminants 100 from the self-cleaning film 14, and/or may not prevent contaminant 100 or squalene adhesion to the self-cleaning film 14.

In another non-limiting embodiment, the photocatalytic material may be doped with silver, and the method 70 may further include disrupting bacteria growth on the substrate 12. Alternatively, as described with reference to FIG. 3C, the self-cleaning film 14 may include a second plurality of regions 132 disposed within the monolayer 30 such that each of the second plurality of regions 132 abuts and is surrounded by the oleophobic material, wherein each of the second plurality of regions 132 includes silver; and the method 70 may likewise include disrupting bacteria growth on the substrate 12.

That is, the second plurality of regions 132 may also be situated within and along the monolayer 30. In one embodiment, the second plurality of regions 132 may be equally spaced apart from each other along the first surface 16. In other embodiments, the second plurality of regions 132 may be randomly spaced throughout the monolayer 30 along the first surface 16. In still other embodiments, the second plurality of regions 132 may be arranged in the non-periodic pattern 34 within the monolayer 30.

The silver may be characterized as a nanoparticle and may have an average diameter measureable on a nanometer scale.

Alternatively, the silver may be characterized as a particle and may have an average diameter measureable on a micrometer scale. Generally, the silver may be present in the self-cleaning film 14 in an amount of from about 2 parts by volume to about 35 parts by volume based on 100 parts by volume of the self-cleaning film 14. The silver may provide the self-cleaning film 14 with anti-microbial and air-purifying properties and soil-resistance. For example, the silver may disrupt microbe cellular function. In particular, the silver may contribute to phospholipid decomposition such that a microbe cell well cannot undergo respiration.

Therefore, for embodiments including silver or another dopant, the self-cleaning film 14 may be a tribid film including the oleophobic material, the photocatalytic material, and silver. Alternatively, for embodiments that do not include silver or other dopant, the self-cleaning film 14 may be a hybrid film including the oleophobic material and the photocatalytic material.

Referring again to FIG. 3A, the self-cleaning film 14 formed by the method 70 may define a contact angle 64 with water of greater than 140°. For example, the self-cleaning film 14 may define a contact angle 64 with water of greater than or equal to 150°. As such, water, oils, and contaminants 100 may effectively bead on and translate across the first surface 16. Stated differently, water, oils, and contaminants 100 may be mobile and effectively translate along the first surface 16 and the self-cleaning film 14 may not be wettable.

In addition, with continued reference to FIG. 3A, the self-cleaning film system 10 may further include a light source 38 disposed adjacent the first edge 26 and configured for emitting electromagnetic radiation. For example, the light source 38 may be an ultraviolet light-emitting diode and the electromagnetic radiation may have a wavelength of from 400 nm to 100 nm. Alternatively, the light source 38 may be an incandescent bulb or a visible light-emitting diode and the electromagnetic radiation may have a wavelength of from 740 nm to 380 nm.

Referring again to FIGS. 1 and 2, the method 70 may be a continuous roll-to-roll ink jet printing process. That is, the method 70 of forming the self-cleaning film system 10 by ink jet printing 72 the composition 74 onto the substrate 12 and curing the composition 74 to form the self-cleaning film 14 disposed on the substrate 12 may further include feeding 94 the substrate from a first roll 96 (FIG. 2) in preparation for ink jet printing 72 the composition 74 onto the substrate 12.

After feeding 94, the method 70 may include continuously ink jet printing 72 the composition 74 onto the substrate 12, and continuously rolling 98 the self-cleaning film 14 disposed on the substrate 12 onto a second roll 196 (FIG. 2) to thereby form the self-cleaning film system 10. That is, the method 70 may be a continuous process rather than a batch process and may therefore be efficient and cost-effective. Further, the method 70 may be characterized as an additive manufacturing process rather than as a process that requires subtraction or removal of material. As such, the method 70 may be simple and consolidate manufacturing steps or operations.

As described above, the first plurality of regions 32 may be useful for removing fingerprints from the self-cleaning film 14 so that the self-cleaning film 14 exhibits self-cleaning capability. In another embodiment, the self-cleaning film 14 may include the second plurality of regions 132 (FIG. 3C) including silver. Such second regions 132 may be useful for increasing the anti-fouling and anti-microbial properties of the self-cleaning film 14 and may assist with odor removal from an ambient environment.

More specifically, referring again to FIGS. 3A and 3E, the method 70 may further include irradiating 120 the first plurality of regions 32 with electromagnetic radiation having a wavelength of from 400 nm to 100 nm, i.e., irradiating 120 the first plurality of regions 32 with ultraviolet light. Alternatively, the method 70 may include irradiating 120 the first plurality of regions 32 with electromagnetic radiation having a wavelength of from 740 nm to 380 nm, i.e., irradiating 120 the first plurality of regions 32 with visible light. That is, the light source 38 (FIG. 3A) may be selected to emit electromagnetic radiation having a wavelength tuned to a bandgap of the photocatalytic material to initiate photocatalysis of the squalene deposited as a fingerprint. As used herein, the terminology bandgap refers to a difference in energy between the highest permitted energy level for an electron in a valence band of the photocatalytic material and the lowest permitted energy level in a conduction band of the photocatalytic material. In other words, the bandgap refers to the minimum amount of light required to make the photocatalytic material electrically conductive.

The method 70 may further include contacting 102 the self-cleaning film 14 and squalene, i.e., contacting 102 at least one of the first plurality of regions 32 and squalene. That is, contacting 102 may include touching the self-cleaning film 14 such that an operator deposits fingerprints, squalene, organic matter, and/or oils onto the first surface 16 (FIG. 3A). Oils may include oils of fatty acids and may be synthesized naturally and applied to the self-cleaning film 14 as the operator touches the self-cleaning film 14, or may be applied to the self-cleaning film 14 artificially such as by spraying or coating. Contact between the squalene or contaminant 100 and the photocatalytic material which is exposed to electromagnetic radiation emitted by the light source 38 may initiate a photocatalytic reaction. More specifically, the photocatalytic material may be a photocatalyst such as titanium dioxide or titanium dioxide doped with silver. The photocatalytic reaction may create a strong oxidation agent and breakdown the organic matter, e.g., squalene, to carbon dioxide and water in the presence of the photocatalyst, i.e., the photocatalytic material; electromagnetic radiation, e.g., ultraviolet light; and water, e.g., humidity from ambient conditions. As such, the photocatalytic material not be consumed by the catalytic reaction, but may instead solely accelerate the photocatalytic reaction as a non-reactant.

In greater detail, when electromagnetic radiation having a desired wavelength illuminates the photocatalytic material, e.g., titanium dioxide, titanium dioxide doped with silver, or a mixture of titanium dioxide nanoparticles and silver nanoparticles, an electron from the valence band of the photocatalytic material may promote to the conduction band of the photocatalytic material, which in turn may create a hole in the valence band and an excess of negative charge or electron in the conduction band. The hole may assist oxidation and the electron may assist reduction. Generally, the hole may combine with water to produce a hydroxyl radical (—OH). The hole may also react directly with squalene or other organic material to increase an overall self-cleaning efficiency of the self-cleaning film 14. Similarly, oxygen in the ambient environment surrounding the photocatalytic material may be reduced by the electron to form a superoxide ion ($.O_2-$), which in turn may oxidize the organic material present on the self-cleaning film 14. Therefore, the method 70 may include oxidizing 104 the squalene. For embodiments including silver, the hydroxyl radical may also decompose a phospholipid portion of a microbe cellular wall and cytoplasm wall such that the microbe dies from lack of respiration, which may decompose organic matter present on the self-cleaning film 14 and contribute to anti-fouling and anti-staining properties of the self-cleaning film 14.

In addition, the hole may become trapped before recombination with the electron. For such situations, the photocatalytic material may be functionalized. For example, the method may include doping titanium dioxide with, for example, palladium or ruthenium. The palladium or ruthenium may act as an electrocatalyst and may increase a transfer of electrons to oxygen molecules, which may in turn lower the occurrence of the recombination of electrons and holes.

Further, organic material that is present on the self-cleaning film 14 at the monolayer 30 rather than in direct contact with the first plurality of regions 32 may be in dynamic equilibrium with the first surface 16 (FIG. 3A) and may diffuse toward a comparatively higher-energy location on the self-cleaning film 14, i.e., the first plurality of regions 32. Therefore, the method 70 may also include diffusing 106 the squalene along the self-cleaning film 14 from the oleophobic material to at least one of the first plurality of regions 32. To improve such diffusion, the light source 38 may be tuned to emit electromagnetic radiation having a wavelength that is tuned to a vibration resonance of the squalene and the fluorinated material. Such tuning may enable the squalene or fingerprint to wiggle or translate along the monolayer 30 to the first plurality of regions 36 where the squalene may undergo the photocatalytic reaction described above. Alternatively or additionally, the self-cleaning film 14 may also be heated, for example by infrared radiation, to further improve diffusion across the monolayer 30 towards the first plurality of regions 32.

As such, the method 70 may further include vaporizing 108 the squalene. More specifically, once the squalene contacts the photocatalytic material at the first plurality of regions 32, the squalene may be photolyzed into comparatively low vapor pressure-sized pieces or parts, which may vaporize off the self-cleaning film 14 and thereby remove the fingerprint or squalene from the self-cleaning film 14. Therefore, the self-cleaning film system 10 may be characterized as self-cleaning. That is, the self-cleaning film 14 may protect the substrate 12 by removing, e.g., oxidizing 104 and vaporizing 108, the fingerprints, squalene, oils, and/or organic material deposited by the touch of an operator. Consequently, the self-cleaning film system 10 and method 70 may provide excellent aesthetics, cleanliness, and readability for display systems, lenses, sensors, and surfaces. In particular, the self-cleaning film 14 may be comparatively thin, super hydrophobic, transparent, scratch-resistant, durable, tough, and may be a hard coating, i.e., may have a hardness of greater than 17.5 GPa and an elastic modulus of greater than 150 GPa.

Referring now to FIG. 3B, in another embodiment, the substrate 12 may further include the anti-reflection film 50 disposed in contact with the self-cleaning film 14. That is, the substrate 12 may include the anti-reflection film 50 or the anti-reflection film 50 may be separately applied and disposed on the substrate 12 so as to be sandwiched between the self-cleaning film 14 and the substrate 12. The anti-reflection film 50 may be configured for reducing a reflection off the self-cleaning film system 10 and thereby improving an efficiency of the self-cleaning film system 10 since lost light in the system 10 may be minimized. As such, the self-cleaning film system 10 may have both self-cleaning capabilities and comparatively low reflectance.

The anti-reflection film 50 may be formed from an anti-reflection coating comprising alternating layers 52, 54, 56 of silicon dioxide and titanium dioxide. The alternating sheets or layers 52, 54, 56 of silicon dioxide and titanium dioxide may have a thickness 58, 60, 62 (FIG. 2C) of from 25 nm to 40 nm. Further, the thickness 58, 60, 62 of each layer 52, 54, 56 may be optimized as set forth below to achieve broadband, spectral performance over wide incident angles.

For example, as described with reference to FIG. 3B, the anti-reflection film 50 may include a first sheet 52 formed from titanium dioxide or other material having a comparatively low index of refraction. The first sheet 52 may be formed from titanium dioxide nanoparticles, may have a first thickness 58 of from 10 nm to 125 nm, e.g., 25 nm to 40 nm. In some embodiments, the first thickness 58 may be, for example, 15 nm or 20 nm or 30 nm or 33 nm or 35 nm or 45 nm or 50 nm or 55 nm or 60 nm or 70 nm or 80 nm or 90 nm or 100 nm or 110 nm, and may have a comparatively low index of refraction. The anti-reflection film 50 may include a second sheet 54 formed from silicon dioxide or another material having a comparatively high index of refraction and disposed on the first sheet 52. The second sheet 54 may be formed from silicon dioxide nanoparticles and may have a second thickness 60 of from 10 nm to 125 nm, e.g., 25 nm to 40 nm, and a comparatively high index of refraction. For example, the second thickness 60 may be 15 nm or 20 nm or 30 nm or 33 nm or 35 nm or 45 nm or 50 nm or 55 nm or 60 nm or 70 nm or 80 nm or 90 nm or 100 nm or 110 nm. The anti-reflection film 50 includes a third sheet 56 formed from titanium dioxide or other material having a comparatively low index of refraction and disposed on the second sheet 54 and in contact with the self-cleaning film 14. The third sheet 56 may have a third thickness 62 of from 10 nm to 125 nm, e.g., 25 nm to 35 nm, and a comparatively low index of refraction. The third thickness 62 may be 15 nm or 20 nm or 30 nm or 33 nm or 35 nm or 45 nm or 50 nm or 55 nm or 60 nm or 70 nm or 80 nm or 90 nm or 100 nm or 110 nm. In one specific embodiment, the third thickness may be 30 nm. Although not shown, the anti-reflection film 50 may also include more than three layers or sheets 52, 54, 56. For example, the substrate 12 or fourth layer may have a fourth thickness 66 of from 40 nm to 60 nm. The substrate 12 or fourth layer may be formed from silicon dioxide and may have a fourth thickness 66 of 45 nm or 50 nm or 55 nm. The substrate 12 or fourth layer may have a comparatively high index of refraction. Stated differently, for some embodiments, the anti-reflection film 50 may include four layers and the self-cleaning film 14 may be disposed on top of the anti-reflection film 50.

In other embodiments, the self-cleaning film 14 may replace the topmost layer of the anti-reflection film 50. Further, the oleophobic material may have an index of refraction of from about 1.2 to about 1.6, e.g., from about 1.3 to about 1.5, according to a percentage of any fluorine present in the oleophobic material. Consequently, the self-cleaning film system 10 may include a comparatively thicker monolayer 30 formed from the oleophobic material, which may in turn contribute to comparatively greater photocatalytic activity of the photocatalytic material. The oleophobic material may also be transparent and have excellent durability.

Therefore, referring again to FIG. 1, the method 70 may include, prior to ink jet printing 72 the composition 74, ink jet printing 172 the anti-reflection film 50. Ink jet printing 172 the anti-reflection film 50 may include any of the processes described above, e.g., piezoelectric ink jet printing and/or bubble ink jet printing. Further, ink jet printing 172 the anti-reflection film 50 may include depositing each of the first sheet 54, second sheet 54, and third sheet 56 individually and sequentially. That is, ink jet printing 172 the anti-reflection film 50 may include depositing the first sheet 52 before depositing the second sheet 54, and depositing the second sheet 54 before depositing the third sheet 56. Further, for this embodiment, ink jet printing 72 the composition 74 may include depositing the composition 74 onto the third sheet 56, i.e., on top of the anti-reflection film 50, such that the first plurality of regions 32 form the non-periodic pattern 34 set forth above.

Figure 3D:
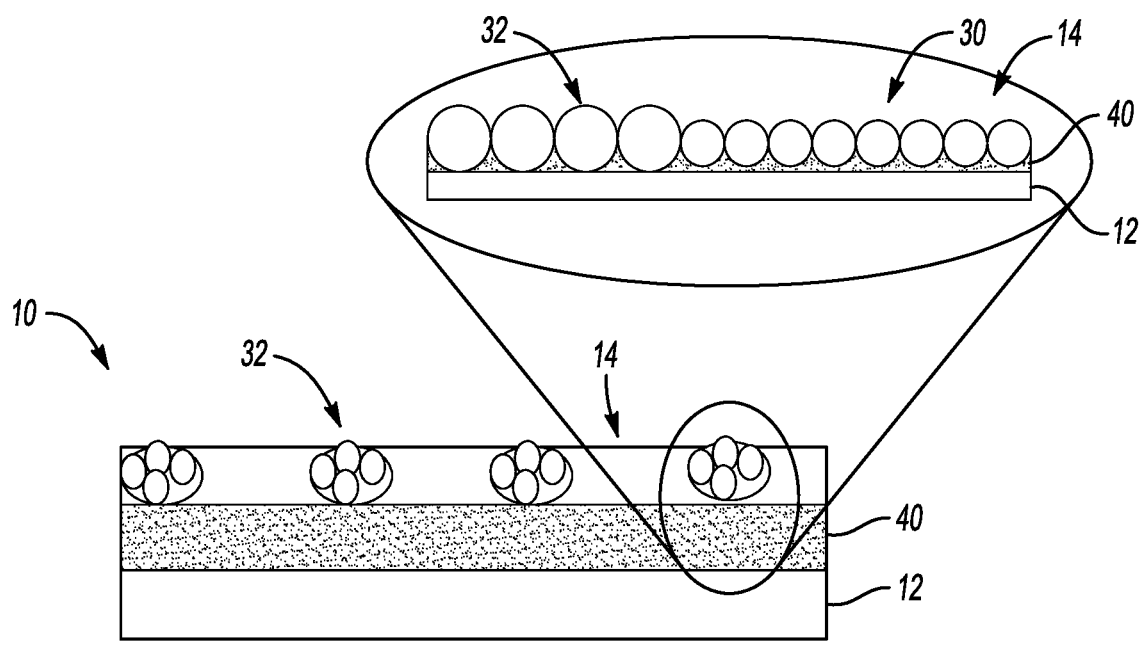
FIG. 3D is a schematic illustration of a cross-sectional and magnified view of a further embodiment of the self-cleaning film system of FIG. 3 taken along section line 3-3.
Figure 3E:
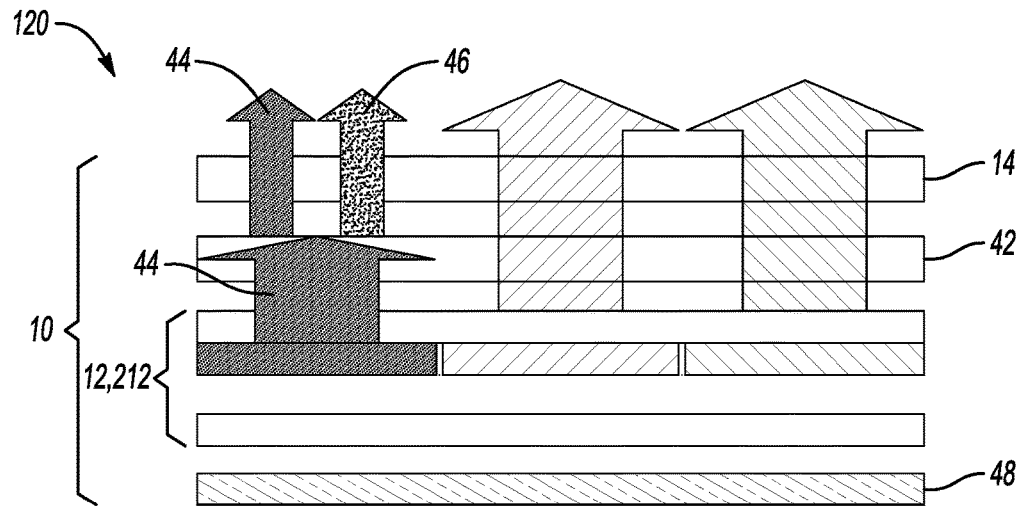
FIG. 3E is a schematic illustration of a cross-sectional view of another embodiment of the self-cleaning film system of FIG. 3.

Referring now to FIG. 3D, in another embodiment, the substrate 12 may further include an adhesion layer 40 formed from a sol-gel material and disposed in contact with the self-cleaning film 14. The adhesion layer 40 may be included for embodiments that include nanoparticles deposited onto a substrate 12 formed from silicon dioxide since such nanoparticles may not otherwise be chemically bonded or chemisorbed onto the silicon dioxide substrate 12. That is, without the adhesion layer 40, the nanoparticles may only be held in place on the substrate 12 by comparatively weak van der Walls forces or physisorbed onto the silicon dioxide substrate 12. Such comparatively weaker physical bonding may allow nanoparticles to be scratched off of the substrate 12.

The substrate 12 may include the adhesion layer 40 or the adhesion layer 40 may be separately applied and disposed on the substrate 12 so as to be sandwiched between the self-cleaning film 14 and the substrate 12. In particular, the adhesion layer 40 may be formed from a silicon alkoxide precursor. However, other suitable alkoxide precursors may be formed form titanium, tin, zirconium, cerium, and other metals. The silicon alkoxide precursor may be hydrolyzed and condensed to form a gel network defining pores filled with liquid. The gel network may be heated to vaporize the liquid from the pores, form additional linkages in the gel network, and shrink the gel network to thereby form the gel. Consequently, the photocatalytic material, i.e., the nanoparticles, may be physically trapped in place by the adhesion layer 40, i.e., restrained in place in the gel. For nanoparticles that are also metal oxides, the photocatalytic material may also be chemically bonded to the adhesion layer 40.

Figure 4:
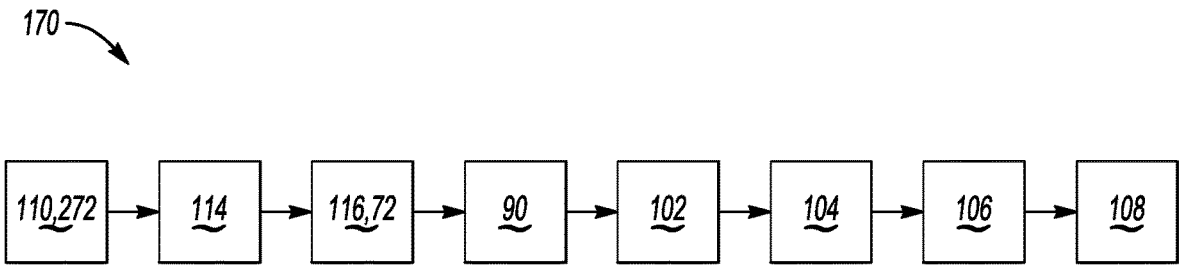
FIG. 4 is a flowchart of another embodiment of the method of forming the self-cleaning film system of FIG. 1.

Therefore, in another embodiment described with reference to FIG. 4, the method 170 may include disposing 110 the sol-gel material onto the substrate 12. For example, the disposing 110 may include ink jet printing 272 the sol-gel material from the printhead 76 onto the substrate 12 via any of the ink jet printing 72 processes set forth above, e.g., piezoelectric ink jet printing and/or bubble ink jet printing. Alternatively, disposing 110 may include dipping, wiping, spraying, meniscus coating, wet coating, bar coating, spin coating, flow coating, roll coating, combinations thereof, and the like.

Further, the method 170 includes hydrolyzing and condensing 114 the sol-gel material to chemically bond the adhesion layer 40 to the substrate 12. Hydrolyzing and condensing 114 may include adding and removing water, respectively, to and from the sol-gel material via hydrolysis and condensation reactions to thereby form the aforementioned gel network defining pores filled with liquid.

In addition, the method 170 includes, after disposing 110, depositing 116 the composition 74 onto the adhesion layer 40, wherein the composition 74 includes the oleophobic material and the photocatalytic material. Depositing 116 may include ink jet printing 72 the composition 74 from the printhead 76 onto the adhesion layer 40 by simultaneously depositing 116 the oleophobic material and the photocatalytic material onto the adhesion layer 40. Alternatively, depositing 116 may include dipping, wiping, spraying, meniscus coating, wet coating, bar coating, spin coating, flow coating, roll coating, combinations thereof, and the like.

The method 170 also includes curing 90 the composition 74 to form the self-cleaning film 14 disposed on the adhesion layer 40 and thereby form the self-cleaning film system 10. The self-cleaning film 14 includes the first plurality of regions 32 including the photocatalytic material and disposed within the oleophobic material such that each of the first plurality of regions 32 abuts and is surrounded by the oleophobic material. Further, for the method 170, the photocatalytic material is physically trapped by the adhesion layer 40, i.e., trapped in place or restrained in the gel. For nanoparticles or photocatalytic materials that are also metal oxides, the photocatalytic material may also be chemically bonded to the adhesion layer 40.

Referring now to FIG. 3E, in another embodiment, the substrate 12 may further include an upconversion layer 42 formed from a luminescent material and disposed in contact with the self-cleaning film 14. The upconversion layer 42 may be included for embodiments that include the photocatalytic material, but are not otherwise exposed to sufficient electromagnetic radiation in an ambient operating environment during use of the self-cleaning film 14 to sufficiently photocatalyze contaminants 100. For example, the upconversion layer 42 may enable operation of the self-cleaning film 14 even during darkness.

More specifically, the upconversion layer 42 may harvest and convert other wavelengths of electromagnetic radiation 44 to thereby supply the photocatalytic material with an ultraviolet wavelength of electromagnetic radiation 46 during operation of the self-cleaning film 14. In particular, the upconversion layer 42 may be configured for converting a first electromagnetic radiation 44 having a wavelength of from 490 nm to 450 nm, i.e., blue light, to a second electromagnetic radiation 46 having an ultraviolet wavelength of from 10 nm to 400 nm, i.e., ultraviolet light. Therefore, the self-cleaning film system 10 may not require additional stand-alone ultraviolet-emitting diodes and/or drive circuits to generate enough ultraviolet electromagnetic radiation 46 to activate the photocatalytic material. As such, the upconversion layer 42 is efficient, cost-effective, and lightweight and may eliminate additional ultraviolet electromagnetic radiation-generating components.

The substrate 12 may include the upconversion layer 42 or the upconversion layer 42 may be separately applied and disposed on the substrate 12 so as to be sandwiched between the self-cleaning film 14 and the substrate 12. In particular, the upconversion layer 42 may be formed from a suitable luminescent material including, but not limited to, a lanthanide-doped inorganic phosphor, an organic sensitizer/acceptor such as $Yb^{3+}$ dopants and $Er^{3-}$ emitters, and the like in the form of, for example, nanocrystal suspensions, nano/microcrystalline powders, and polycrystalline ceramics.

As best shown in FIG. 3E, in one embodiment, the substrate 12 may be a display 212 and may include a backlight 48 configured for emitting the first electromagnetic radiation 44 towards the upconversion layer 42. That is, the display 212 and backlight 48 may project or emit the first electromagnetic radiation 44 towards the upconversion layer 42. The display 212 may be, for example, a liquid crystal display, an organic light emitting diode display, or an opaque surface and may be configured for presenting information to an operator via the backlight 48. In one non-limiting example, the display 212 may be a liquid crystal display disposed within a housing and configured for emitting an image. The display 212 may optically modulate the first electromagnetic radiation 44 and emit the image, which may eventually be visible to an operator as text, a diagram, an object, a shape, and the like. For example, the image may be visible to the operator as a speed of travel, driving directions, ambient temperature data, a warning, a level indicator, text, and the like.

Although not shown, the display 212 may include a passive matrix display arrangement or an active matrix display arrangement, i.e., a thin film transistor display arrangement. The passive matrix display arrangement may include a grid of conductors having one of a plurality of individual pixels disposed at each intersection in the grid. An electrical current may be transmitted across two conductors to control the operation and light of an individual pixel. Alternatively, the active matrix display arrangement may include a transistor at each intersection.

Further, although also not shown, the display 212 may include a first panel, which may include one or more polarizers configured for polarizing visible light, i.e., the first electromagnetic radiation 44 having a wavelength in the visible spectrum. The display 212 may also include a projector configured for emitting the first electromagnetic radiation 44. The first electromagnetic radiation 44 may be polarized light. In particular, the first electromagnetic radiation 44 may have an s-polarization state or a p-polarization state. In addition, the display 212 may include optics to focus, magnify, refract, and/or reflect light, and may define one or more apertures. In a non-limiting example, the display 212 may emit the first electromagnetic radiation 44 from a light-emitting diode and/or the backlight 48. The display 212 may also include one or more optical foils disposed adjacent the first panel. Suitable optical foils may enhance a brightness or clarity of the image and may include a brightness enhancement film, a dual brightness enhancement film, a plurality of quantum dots, and combinations thereof.

In operation, as the backlight 48 emits the first electromagnetic radiation 44 through the upconversion layer 42, the upconversion layer 42 may convert the first electromagnetic radiation 44 to the second electromagnetic radiation 46 which may then transmit to the photocatalytic material of the self-cleaning film 14.

Figure 5:
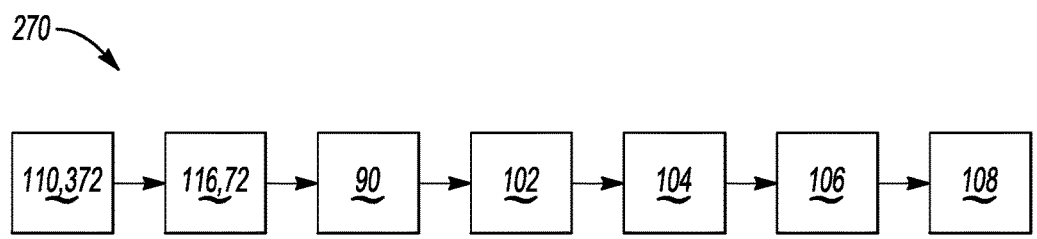
FIG. 5 is a flowchart of an additional embodiment of the method of forming the self-cleaning film system of FIG. 1.

Therefore, in another embodiment described with reference to FIG. 5, the method 270 includes disposing 110 the upconversion layer 42 formed from the luminescent material onto the substrate 12. The upconversion layer 42 is configured for converting the first electromagnetic radiation 44 having the wavelength of from 490 nm to 450 nm to the second electromagnetic radiation 46 having the ultraviolet wavelength of from 10 nm to 400 nm. For example, the disposing 110 may include ink jet printing 372 the luminescent material from the printhead 76 onto the substrate 12 via any of the ink jet printing 72 processes set forth above, e.g., piezoelectric ink jet printing and/or bubble ink jet printing. Alternatively, disposing 110 may include dipping, wiping, spraying, meniscus coating, wet coating, bar coating, spin coating, flow coating, roll coating, combinations thereof, and the like.

In addition, the method 270 includes, after disposing 110, depositing 116 the composition 74 onto the upconversion layer 42, wherein the composition 74 includes the oleophobic material and the photocatalytic material. Depositing 116 may include ink jet printing 72 the composition 74 from the printhead 76 onto the upconversion layer 42 by simultaneously depositing the oleophobic material and the photocatalytic material onto the upconversion layer 42. Alternatively, depositing 116 may include dipping, wiping, spraying, meniscus coating, wet coating, bar coating, spin coating, flow coating, roll coating, combinations thereof, and the like.

The method 270 also includes curing 90 the composition 74 to form the self-cleaning film 14 disposed on the upconversion layer 42 and thereby form the self-cleaning film system 10. The self-cleaning film 14 includes the first plurality of regions 32 including the photocatalytic material and disposed within the oleophobic material such that each of the first plurality of regions 32 abuts and is surrounded by the oleophobic material. Further, for the method 270, the self-cleaning film 14 may be physically bonded or chemically bonded to the upconversion layer 42.

Therefore, the method 70, 170, 270 is simple, economical, reproducible, and cost-effective and may consolidate or eliminate additional manufacturing steps or processes to form the self-cleaning film system 10. As such, the method 70, 170, 270 and self-cleaning film system 10 may be suitable for applications in which an operator may touch and deposit fingerprints, oils, and/or other organic or carbon-based contaminants 100 or pathogens onto a screen, lens, or surface. More specifically, the method 70, 170, 270 and self-cleaning film system 10 may be useful for applications requiring a clean, substantially fingerprint-free screen, lens, or surface.

While the best modes for carrying out the disclosure have been described in detail, those familiar with the art to which this disclosure relates will recognize various alternative designs and embodiments for practicing the disclosure within the scope of the appended claims.

What is claimed is:

1. A method of forming a self-cleaning film system, the method comprising:
    ink jet printing a composition onto a substrate, wherein the composition includes:
        an oleophobic material; and
        a photocatalytic material; and
    curing the composition to form a self-cleaning film disposed on the substrate and thereby form the self-cleaning film system;
    wherein the self-cleaning film includes a first plurality of regions including the photocatalytic material and disposed within the oleophobic material such that each of the first plurality of regions abuts and is surrounded by and not covered by the oleophobic material, wherein the oleophobic material defines a monolayer.

2. The method of claim 1, wherein ink jet printing includes depositing the composition from a printhead onto the substrate.

3. The method of claim 2, wherein the printhead includes at least one piezoelectric crystal, and further wherein ink jet printing includes propelling the composition from the at least one piezoelectric crystal onto the substrate.

4. The method of claim 2, wherein depositing includes heating the composition and expelling the composition from the printhead onto the substrate.

5. The method of claim 1, wherein ink jet printing includes simultaneously depositing the oleophobic material and the photocatalytic material onto the substrate.

6. The method of claim 1, wherein curing includes heating the composition.

7. The method of claim 1, wherein the oleophobic material is one of polytetrafluoroethylene and fluorinated diamond-like carbon; wherein the photocatalytic material is titanium dioxide present in anatase form; and further wherein ink jet printing includes depositing the composition onto the substrate such that the first plurality of regions form a non-periodic pattern.

8. The method of claim 1, wherein the substrate includes an anti-reflection film including:
- a first sheet formed from titanium dioxide;
- a second sheet formed from silicon dioxide and disposed on the first sheet; and
- a third sheet formed from titanium dioxide and disposed on the second sheet; and
- further including, prior to ink jet printing the composition, ink jet printing the anti-reflection film;
- wherein ink jet printing the composition includes depositing the composition onto the third sheet such that the first plurality of regions form a non-periodic pattern.

9. The method of claim 1, wherein the photocatalytic material is doped with silver; and wherein the method further includes disrupting bacteria growth on the substrate.

10. The method of claim 1, wherein the self-cleaning film system further includes a second plurality of regions disposed within the oleophobic material such that each of the second plurality of regions abuts and is surrounded by the oleophobic material, wherein each of the second plurality of regions includes silver; and wherein the method further includes disrupting bacteria growth on the substrate.

11. The method of claim 1, further including:
- feeding the substrate from a first roll;
- after feeding, continuously ink jet printing the composition onto the substrate; and
- continuously rolling the self-cleaning film disposed on the substrate onto a second roll to thereby form the self-cleaning film system.

12. The method of claim 1, further including:
- contacting at least one of the first plurality of regions with squalene;
- diffusing the squalene along the self-cleaning film from the oleophobic material to at least one of the first plurality of regions;
- oxidizing the squalene; and
- vaporizing the squalene.

* * * * *